(12) United States Patent
van Haag

(10) Patent No.: US 7,341,550 B2
(45) Date of Patent: Mar. 11, 2008

(54) ROLL, IN PARTICULAR MIDDLE ROLL OF A CALENDAR, AND CALENDAR

(75) Inventor: Rolf van Haag, Kerken (DE)

(73) Assignee: Voith Paper Patent GmbH, Heidenheim (DE)

( * ) Notice: Subject to any disclaimer, the term of this patent is extended or adjusted under 35 U.S.C. 154(b) by 512 days.

(21) Appl. No.: 10/685,390

(22) Filed: Oct. 16, 2003

(65) Prior Publication Data

US 2004/0154479 A1    Aug. 12, 2004

(30) Foreign Application Priority Data

Oct. 17, 2002    (DE) ................ 102 48 519

(51) Int. Cl.
*F16C 13/00* (2006.01)
*B41F 5/00* (2006.01)
(52) U.S. Cl. .............. 492/42; 492/45; 492/6; 101/216
(58) Field of Classification Search ............. 492/47, 492/45, 42, 6; 101/216
See application file for complete search history.

(56) References Cited

U.S. PATENT DOCUMENTS

| 4,125,073 | A | * | 11/1978 | Bain ................ 101/216 |
| 4,739,702 | A | * | 4/1988 | Kobler ............. 101/216 |
| 5,005,748 | A | * | 4/1991 | Kim .............. 242/615.2 |
| 5,235,909 | A | * | 8/1993 | Gerstenberger et al. .... 101/216 |
| 5,257,965 | A | | 11/1993 | Fuchs et al. |
| 5,420,664 | A | | 5/1995 | Miwa et al. |
| 5,595,117 | A | * | 1/1997 | Chrigui ............ 101/216 |
| 6,312,340 | B1 | | 11/2001 | Gassen et al. |
| 6,471,625 | B1 | | 10/2002 | Jimenez |
| 6,499,401 | B1 | * | 12/2002 | Koch et al. ......... 101/484 |
| 6,805,053 | B2 | * | 10/2004 | Berti et al. .......... 101/480 |
| 6,938,515 | B2 | * | 9/2005 | Glockner et al. ....... 464/180 |
| 2002/0060021 | A1 | | 5/2002 | Kayser et al. |

FOREIGN PATENT DOCUMENTS

| DE | 1181560 | 11/1964 |
| DE | 3011384 | 10/1981 |
| DE | 3632418 | 3/1988 |
| DE | 9301059 | 4/1993 |
| DE | 19726293 | 12/1998 |
| DE | 10008800 | 9/2001 |
| EP | 0585897 | 3/1994 |
| EP | 1146249 | 10/2001 |
| GB | 1187326 | 4/1970 |
| GB | 2073368 | 10/1981 |
| JP | 61-18658 | 1/1986 |

OTHER PUBLICATIONS

Patent Abstracts of Japan, vol. 010, Not. 167 (M-488) published Jun. 13, 1986.

* cited by examiner

*Primary Examiner*—Essama Omgba
(74) *Attorney, Agent, or Firm*—Greenblum & Bernstein, P.L.C.

(57) ABSTRACT

Roll and calender including the roll that includes a roll jacket structured and arranged to surround an interior space. Roll also includes an absorber arrangement having at least one passive vibration absorber located within the interior space. The instant abstract is neither intended to define the invention disclosed in this specification nor intended to limit the scope of the invention in any way.

34 Claims, 5 Drawing Sheets

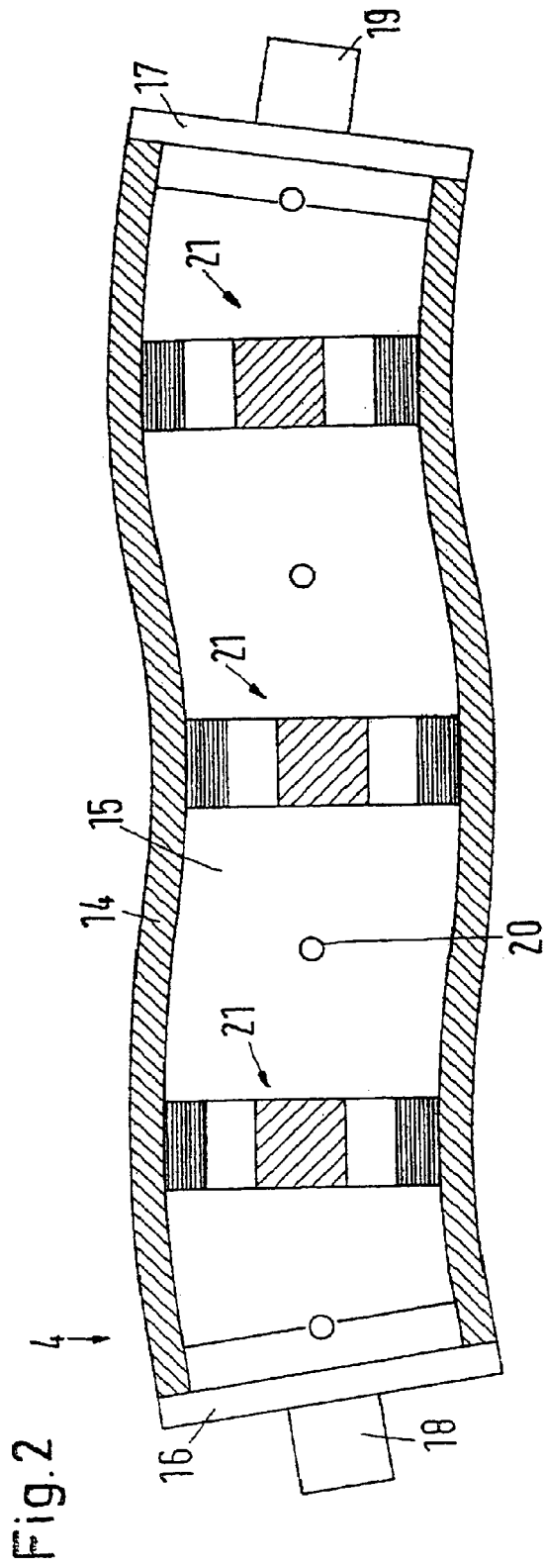
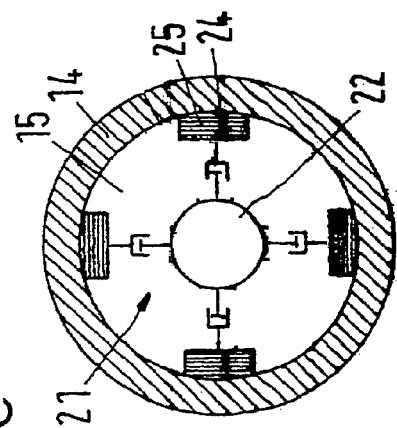
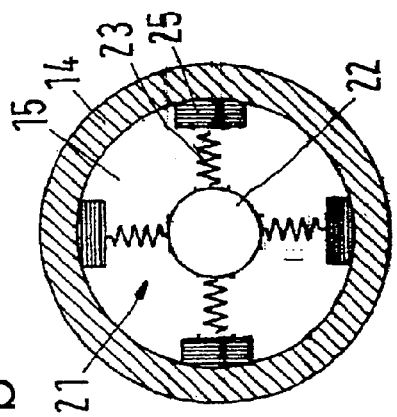
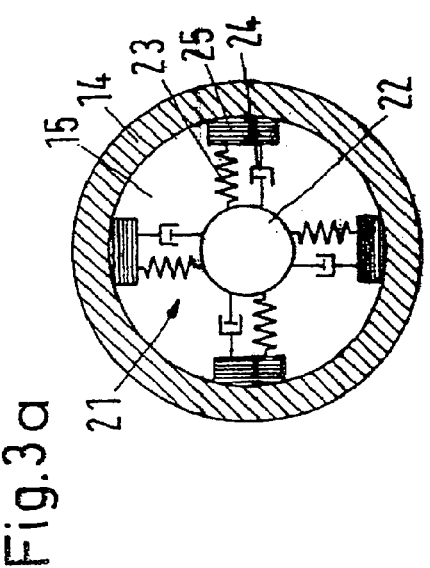

ROLL, IN PARTICULAR MIDDLE ROLL OF A CALENDAR, AND CALENDAR

CROSS-REFERENCE TO RELATED APPLICATIONS

The present application claims priority under 35 U.S.C. §119 of German Patent Application No. 102 48 519.4, filed on Oct. 17, 2002, the disclosure of which is expressly incorporated by reference herein in its entirety.

BACKGROUND OF THE INVENTION

1. Field of the Invention

The invention relates to a roll, in particular a middle roll of a calender, with a roll jacket that surrounds an interior space. The invention further relates to a calender with a roll stack that features at least two middle rolls, at least one of which features a roll jacket that surrounds an interior space.

2. Discussion of Background Information

Calenders and middle rolls of the type in question are used to glaze paper or cardboard webs. These webs are thereby guided through nips that are formed between adjacent rolls and in these nips they are acted on with increased pressure and as a rule also with increased temperature. The nips are thereby embodied as so-called "soft" nips that are limited by a hard roll with smooth surface and a soft roll. The hard roll is made of metal as a rule, whereby the surface is also made of metal. The "soft" roll interacting with it features a comparatively softer surface. As a rule, this surface is made of a plastic coating that can be applied to a roll body, whereby the roll body itself can likewise be made of metal.

The roll stack normally features two end rolls, at least one of which, but usually both of which, are embodied as sag (deflection) compensation rolls. The sag compensation rolls feature a circulating roll jacket that can be acted on with the aid of hydraulic support elements such that a desired deflection line, preferably an extended line, is produced in the nips. The middle rolls located between the two end rolls are formed in a less costly manner. As a rule they comprise a roll jacket that surrounds an interior space. The interior space is closed at the faces by roll plugs.

After a certain operating time it can regularly be observed with such calenders that a barring formation occurs. Barrings are stripes that run crosswise to the travel direction of the web. As soon as these stripes become visible, the paper or cardboard web is broke that has to be disposed of.

The mechanisms causing this barring formation have not yet been finally resolved. It is assumed that it is a matter of self-excited vibrations that make the soft rolls "polygonal" through material wear over the course of time, or to put it more simply, that impress a wave pattern on the surface of the soft rolls. A roll stack that is formed of several rolls, has a plurality of natural frequencies. This does not refer to the natural frequencies of the individual rolls per se, such as, e.g., natural frequencies in bending, but the natural vibration forms that result from the vibrating roll masses on the spring and damper systems of the interposed plastic coatings.

An operating calender produces exciter forces, the frequencies of which are composed of the multiples of the rotational speeds of the roll. These exciter forces can be created by non-homogeneities, anisotropies or geometrical distortions (out of roundnesses). Likewise, fluctuations in the paper thickness of the paper or cardboard web entering the calender can excite the roll stack. A paper web entering the calender is still relatively rough before the glazing process. Moreover, a paper or cardboard web is not normally free from fluctuations in basis weight or thickness. When an excitation frequency, however it is caused, coincides with a natural frequency of the roll stack, the vibration system responds with enlarged vibration amplitudes. Due to the plurality of possible exciters and the plurality of possible natural vibration forms, resonance points usually cannot be bypassed by structural devices. Normally the vibration system is also so strongly damped and the exciter forces are so small that the resulting vibration movements are not directly disruptive. However, over a shorter or longer period these vibration movements are impressed in the plastic coatings of the elastic rolls, which leads to the barring formation described above after a certain operating duration. Usually several days or weeks elapse before this manifestation has developed so much that it disrupts the production process. The roll then has to be dismantled and reworked, which means considerable expense. Reworking, for example, can entail the roll being ground into a round shape again.

SUMMARY OF THE INVENTION

The present invention extends the service life of a roll in a simple manner.

According to the invention, a middle roll of the type mentioned at the outset includes an absorber arrangement with at least one passive vibration absorber arranged in the interior space.

It is thereby assumed that the roll itself vibrates during operation. This vibration is damped by the absorber arrangement. Thus, the effects of the vibration are weakened. Through this weakening, the service life of the roll is extended, i.e., the period is lengthened in which the roll can still be operated without a barring formation appearing. When the absorber arrangement is arranged in the interior space it can react directly to the vibrations of the roll and bear upon the roll. It is therefore not necessary to take an indirect route here, e.g., via bearing points of the roll or via external absorbers, whose forces have to be coupled into the roll in another way. This keeps the cost of the absorber arrangement relatively low. Since the vibration absorber is embodied as a passive vibration absorber, no external forces have to be generated or energies supplied from outside. Instead, the vibration absorber reacts only to the vibrations of the roll and damps them. Depending on the damping, a phase shift thereby also occurs, which can further delay the formation of barrings. It is not absolutely essential hereby for the vibrations to be completely eliminated. It can definitely be tolerated that after a certain operating time, which, however, is much longer than without absorber arrangement, a reworking of the roll can become necessary.

The vibration absorber preferably acts on the roll jacket. It thus acts on the part of the roll that is directly affected by the vibrations. The damping that the vibration absorber generates thus immediately acts on the "right" place. The vibrations are thus damped wherever they are noticeable in or on the roll.

It is provided in a preferred embodiment that the vibration absorber features a mass that is at least 15% and, in particular, at least 20% of the mass of the roll jacket. Through the use of relatively heavy vibration absorbers, the natural frequencies shift lower. Estimates show that with such heavy installations that are at least 15% and, in particular, at least 20% of the otherwise vibrating mass, longer service lives of the rolls can be achieved.

The vibration absorber is preferably arranged in the axial direction of the roll jacket at a position at which a vibration loop forms during operation. The vibrations that the roll executes and that ultimately lead to the formation of barring have inherent forms. These inherent forms are mostly within a frequency range at which the roll jackets (also called roll capsules) already vibrate in harmonic vibration forms, like the string of a musical instrument. Several vibration loops thus occur distributed over the axial length of the roll jacket, e.g., three to seven vibration loops. When a passive vibration absorber is now arranged at the position where a vibration loop develops during operation, this vibration absorber basically has the best effect. It coincides with the greatest vibration amplitude and can then damp the same very effectively. The vibration loops can be calculated, for example, before the start-up of the roll. However, a particularly simple process is to let the roll run up to the range of a barring formation in which the vibration loops and the vibration nodes are sufficiently marked and thus visible. The passive vibration absorber can then be installed in the roll at the axial position of such a vibration loop.

The vibration absorber is preferably divided into several individual absorbers that are arranged distributed in the axial direction at positions at which a vibration loop respectively forms during operation. Although in many cases it is sufficient to use a passive vibration absorber, e.g., in the area of a vibration loop that forms in the axial center of the roll, an improved damping effect is obtained by arranging an individual absorber at several vibration loops or, as provided in a particularly preferred embodiment, at all vibration loops. It is thereby not even essential to hit the maximum of the vibration loop exactly. A damping effect already occurs if the vibration absorber is arranged in the area of the vibration loop. Ascertaining where the position of the vibration loop lies can therefore be carried out with relatively little precision. With several individual absorbers, the mass of the individual absorbers is cumulative.

The vibration absorber preferably features an absorber frequency that lies below a natural frequency of the roll or of a roll system containing the roll, which natural frequency is decisive for the formation of a barring. When using several individual absorbers, this applies to the natural frequencies resulting therefrom. The absorbers are designed as follows: the contact natural frequency is determined by calculation or measurement, taking into consideration or determining (in the case of measurement) the structural damping. The nearest integral multiple of the roll rotational speeds below a contact natural frequency is calculated. Depending on the vibration form, a distinction should thereby be made between even and odd integral multiples. Depending on the level of the structural damping present, the nearest multiples below the contact natural frequency have to be skipped. If, for example, the undamped contact natural frequency $f_e$=351.5 Hz and the roll rotational speed $f_w$=8 Hz, a ratio $f_e/f_w$=351.5 Hz/8 Hz=43.9375 results. In this case, 43 waves would form on the circumference of the roll. Depending on the system damping, different numbers of waves form. With a degree of system damping D=0.005, as stated, 43 waves form. With a degree of system damping D=0.02, 41 waves form, and with a degree of system damping D=0.05, 39 waves form. This behavior is caused by the phase angle dependent on the degree of damping between the path excitation conditional on the barring and the system behavior of the roll response. The natural frequencies of the individual vibration absorbers are now designed for the frequency to be expected. An excellent damping behavior thus results.

It is hereby preferred that the absorber frequency is coordinated with a barring frequency. It is therefore determined in addition at which of the above-mentioned frequencies the barring formation is strongest, and the absorber frequency of the vibration absorber is coordinated with it. Depending on the degree of system damping, other barring frequencies to be expected can result. The absorber frequency of the vibration absorber should then be coordinated with this barring frequency.

The vibration absorber is preferably formed or embodied as a roll-shaped slide-in body. With a roll-shaped slide-in body relatively heavy installations can be realized in a simple manner, so that at least 15% and, in particular, 20% of the otherwise vibrating mass can easily be achieved. A roll-shaped installation body can also easily be positioned and fixed in the roll jacket. In a concrete case of difficulty, the barring frequency can be determined directly by measuring one or more rolls. Subsequently the new natural frequencies to be expected can be calculated, taking into consideration the additional masses of the vibration absorbers, e.g., the roll-shaped slide-in bodies. Here, too, the nearest integral multiples of the rotational speeds of the rolls below the new contact natural frequencies to be expected are calculated. Depending on the vibration form, a distinction should thereby be made between even and odd integral multiples. The natural frequency of the individual vibration absorbers is then configured according to this barring frequency to be expected (rotational speed of the roll times number of waves). A roll-shaped slide-in body can also be divided in a controlled manner over the length. An undivided slide-in body can in some cases be expedient if the roll mainly moves like a rigid body. Otherwise, it is expedient to divide the slide-in body into several individual absorbers.

The vibration absorber is preferably supported in the roll jacket via a preferably isotropic spring arrangement. The natural frequency of this spring-mass-system (absorber) is coordinated with a problem or excitation frequency of the roll system. The roll system is stabilized through an increased vibration movement of the absorber mass in this problem frequency.

It is hereby preferred for the spring arrangement to feature several cup springs. The spring arrangement can thus be embodied to be relatively rigid.

It is also advantageous that a damper arrangement is provided between the vibration absorber and the roll jacket. The vibrations of the vibration absorber with respect to the roll jacket can then be damped in a controlled manner so that a broadband vibration suppression can be achieved through the vibration absorber.

It is hereby preferred for the damper arrangement and the spring arrangement to be combined with one another. This can be achieved, e.g., by using springs that have a high inherent damping. This is the case, e.g., with the above-mentioned cup springs.

It is likewise possible to couple the absorber mass to the roll jacket without a spring via damping elements. Although this embodiment is not as effective as a correctly adjusted spring-mass damper system, it also shows a reduction in the tendency to barring.

It is also preferred for the vibration absorber to be supported on the roll jacket via at least one support of elastomer material. Elastomer materials have a relatively high inherent damping, although they otherwise feature adequate spring qualities. The use of a support of elastomer material thus combines spring qualities and damping qualities.

The vibration absorber is preferably moveable relative to the roll jacket in a rotatory degree of freedom. This is important above all when inherent forms occur with which the plastic coatings of the rolls are subjected to transverse strain. In this case it is useful to design the roll-shaped slide-in body or its parts with regard to their rotatory degree of freedom as an absorber. To this end the torsional rigidity and/or the damping has to be coordinated with the rotatory natural frequency of the roll jacket.

It is hereby preferred that the rotational movement of the vibration absorber relative to the roll jacket is limited. Only a torsional vibration of the vibration absorber in the roll jacket is therefore permitted, not a complete rotation. This facilitates on the one hand the fixing of the vibration absorber in the roll jacket, but on the other hand also permits an improved vibration damping.

It is also advantageous if the interior space, at least in an area between the vibration absorber and the roll jacket, is filled with a liquid whose viscosity exceeds a predetermined minimum. For example, a ring slot between the roll-shaped slide-in body and the roll jacket can be filled with a viscous oil to adjust the damping properties. When the vibration absorber then moves in the roll jacket, this oil has to be displaced and shifted, which results in an improved damping.

In an alternative embodiment it is provided that the vibration absorber with a surrounding intermediate layer of a viscoelastic material is shrunk in the roll jacket. The viscoelastic material takes on both the spring properties and also to a certain extent damping properties. The shrinking is a relatively simple and yet reliable method of fixing the vibration absorber in the roll jacket.

It is hereby preferred that a pipe is arranged between the roll jacket and the intermediate layer. This facilitates manufacture. When the intermediate layer is provided with the pipe, before shrinking there is a vibration absorber that is compact and that can be used in the heated roll jacket without any special precautionary measures. In addition the pipe can also be cooled particularly when it is made of metal. After a temperature equalization, the vibration absorber is then firmly installed in the roll jacket.

The vibration absorber preferably features a mass element that is supported in a disk of an elastic material, which disk is supported on the jacket. The disk of elastic material then forms both the spring and the damping element for the vibration absorber. The mass element can be displaced by local compression or expansion of the disk. The absorber frequency can be adjusted in certain ranges via the elasticity of the disk. Also a certain rotatory movement of the vibration absorber relative to the roll jacket is possible to a limited extent.

The disk preferably rests on the jacket over its entire circumference. Although in principle it would be sufficient for the disk to be supported on the roll jacket at several points, e.g., three points, if the disk rests on the roll jacket over its entire circumference, the power transmission is completely independent of the direction of the excitation or the response of the vibration absorber. Improved results can thus be achieved. No new non-homogeneities are brought into the roll via the vibration absorber which could lead to a further formation of vibrations.

The mass element preferably projects beyond the disk in the axial direction. The mass element can thus feature a greater mass than the space within the disk would actually permit. In addition, there is thus a certain possibility of tilting the mass element with respect to the roll axis, i.e., the mass element does not always need to be aligned parallel to the roll jacket. This expands the damping possibilities.

The mass element preferably features an enlargement respectively outside the disk. The mass element is thus embodied in a dumb-bell shape with two "weights" at the ends and a bearing in the disk that engages at the connecting rod between the two "weights." A further enlargement of the mass of the mass element can be achieved through the enlargements at the ends. The frequency range in which the vibration absorber can work can thus be enlarged.

The vibration absorber preferably features an absorber frequency that can be changed from outside. As a rule the vibration absorber is aligned with a concrete natural frequency of the roll system and the associated barring frequency. This is sufficient in most cases because a calender is designed for specific parameters (e.g., line load, roll surface temperatures, speed). However, in some cases it is desirable to design the production parameters of the calender in a flexible way. But if the production parameters are changed, the natural frequencies change slightly, too. In this case, it is advantageous to change the absorber frequencies accordingly. A change from outside devices that the roll does not have to be dismantled to change the absorber frequency; rather devices are provided that can change the absorber frequency, e.g., with the aid of a remote control.

It is hereby preferred for the vibration absorber to feature a spring device, the rigidity of which can be changed in a controlled manner. In the case of the elastic disk, this can be achieved, e.g., in that the disk is compressed more or less in the axial direction, whereby naturally the displacement possibility of the mass element within the roll jacket may not be appreciably restricted through the compression.

In an alternative embodiment it is provided that the absorber arrangement features vibration absorbers with different absorber frequencies. If several relevant contact natural frequencies for barring formation exist, several vibration absorbers with different natural frequency can also be used and thus at different positions in the interior of a roll. The different positions are the consequence of different vibration forms.

The present invention provides a calender of the type mentioned at the outset that includes an absorber arrangement with at least one passive vibration absorber arranged in the interior space.

The absorber arrangement is thus able to "damp" the frequencies at which there is a danger of a barring formation. The service life of the roll is thus extended. Since it is a passive vibration absorber, there is no need for an energy feed or control from outside.

The present invention is directed to a roll that includes a roll jacket structured and arranged to surround an interior space, and an absorber arrangement having at least one passive vibration absorber located within the interior space.

According to a feature of the invention, the above-noted roll can be used in combination with a calender roll stack that includes at least two end rolls and at least one middle roll that is the above-noted roll.

In accordance with another feature of the present invention, the vibration absorber can be arranged to act on the roll jacket. Further, the vibration absorber is structured and arranged to act on the roll jacket in a damping manner.

According to still another feature of the invention, the vibration absorber can include a mass that is at least 15% and, in particular, at least 20% of a mass of the roll jacket.

The vibration absorber may be positioned, in an axial direction of the roll jacket, at a location at which a vibration loop forms during operation. The vibration absorber can include a plurality of individual absorbers that are positioned, distributed in the axial direction, at locations at which vibration loops form during operation. Further, an individual absorber may be arranged at each vibration loop.

Moreover, the vibration absorber can have an absorber frequency that lies below a natural frequency of the roll, and the natural frequency may be decisive of the formation of barring. The absorber frequency can be coordinated with a barring frequency.

In accordance with a further feature of the present invention, the vibration absorber may have an absorber frequency that lies below a natural frequency of a roll system comprising the roll, and the natural frequency may be decisive of the formation of barring.

According to the invention, the vibration absorber may include a roll-shaped body. The roll-shaped body can be structured and arranged to slide into the roll.

The roll may also include a spring arrangement structured and arranged to support the vibration absorber in the roll jacket. The spring arrangement may include a plurality of cup springs.

Further, the roll can include a damper arrangement positioned between the vibration absorber and the roll jacket, and, additionally, a spring arrangement combined with the damper arrangement to support the vibration absorber in the roll jacket. The roll can also include at least one support composed of an elastomer material. The vibration absorber may be supported on the roll jacket via the at least one support.

The vibration absorber can be structured and arranged to be moveable relative to the roll jacket. Further, the vibration absorber can be structured to be rotatably movable relative to the roll jacket, and the vibration absorber can be structured to be limitedly rotatably movable relative to the roll jacket.

A liquid can be arranged to fill, at least in an area between the vibration absorber and the roll jacket, the interior space. The liquid may have a viscosity that exceeds a predetermined minimum.

The vibration absorber may include a surrounding intermediate layer composed of a viscoelastic material. Still further, the surrounding intermediate layer can be shrunk in the roll jacket. Also, a pipe may be arranged between the roll jacket and the intermediate layer.

The vibration absorber can include a mass element supported in at least one disk composed of an elastic material, and the disk can be supported on the roll jacket. The disk may rest on the roll jacket over its entire circumference. Further, the mass element can project beyond the disk in an axial direction of the roll. Moreover, the mass element can include an enlargement outside of the disk.

The vibration absorber can have an adjustable absorber frequency, and the absorber frequency may be adjustable from outside of the roll. The vibration absorber can include a spring unit having a rigidity that can be changed in a controlled manner.

The absorber arrangement may include vibration absorbers having different absorber frequencies.

The invention is directed to a calender with a roll stack having at least two middle rolls, at least one of the at least two middle rolls being the above-noted roll.

The present invention is directed to a calender that includes a roll stack having at least two middle rolls, at least one of the at least two middle rolls includes a roll jacket arranged to define and surround an interior space, and an absorber arrangement including at least one passive vibration absorber is located in the interior space.

In accordance with another feature, the invention is directed to a process of damping vibrations in the above-noted calender. The process includes guiding a paper web through the calender and operating the calender, whereby vibrations arise in the calender, which include a plurality of frequencies, and damping the vibrations in the at least one middle roll via the absorber arrangement located in the interior space.

According to another feature of the invention, the vibrations can arise due to at least one of non-homogeneities, anisotropies or geometric distortions in the calender and paper thickness fluctuations or basis weight fluctuations in the web.

Further, prior to operation of the calender, the process can also include determining, by at least one of calculation and measurement, a contact natural frequency of the at least one middle roll, and adjusting an absorber frequency in accordance with the determined contact natural frequency. In accordance with the contact natural frequency of the at least one middle roll, at least one vibration loop can form during the operation of the calender, and the process may also include positioning the at least one passive vibration absorber at a location at which the at least one vibration loop forms. Alternatively, in accordance with the contact natural frequency of the at least one middle roll, a plurality of vibration loops may form during the operation of the calender and the at least one passive vibration absorber comprises a plurality of vibration absorbers, and the process can further include positioning a vibration absorber at locations at which the plurality of vibration loops form. Further, the process can include positioning a vibration absorber at each location at which the plurality of vibration loops form.

In accordance with still yet another feature of the present invention, the process can also include adjusting an absorber frequency of the at least one passive vibration absorber by a remote controlled change of a spring rigidity.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 2 illustrates a longitudinal sectional view of a deflected middle roll;

FIGS. 3A-3C diagrammatically illustrate various embodiments of a vibration absorber;

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
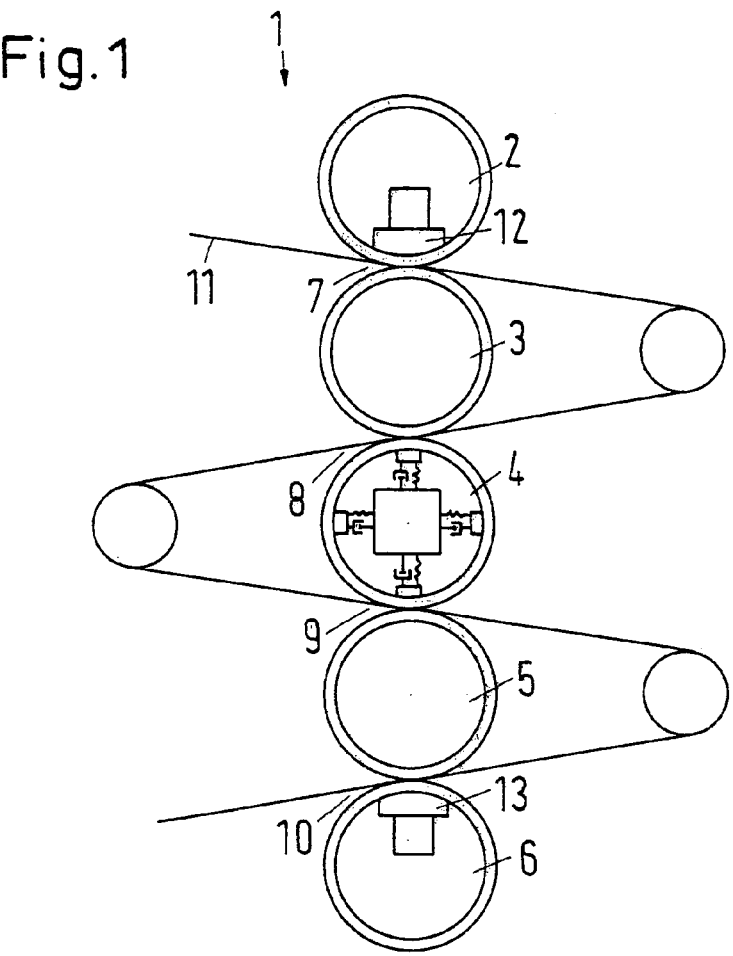
FIG. 1 diagrammatically illustrates a view of a calender.

FIG. 1 shows a calender 1 with a roll stack of five rolls 2-6 that form between them four nips 7-10, through which a material web 11, e.g., a paper web or a cardboard web, is guided. Nips 7-10 are embodied as so-called "soft nips," i.e., they are formed respectively by a soft roll 2, 4, and 6, i.e., a roll with an elastic coating of a plastic (not shown in detail), and a hard roll 3 and 5, i.e., a roll with a surface of metal.

The two end rolls 2 and 6, are embodied as sag compensation rolls, i.e., they feature hydrostatic support elements 12 and 13 that are arranged distributed in the axial direction of the rolls 2 and 6.

Middle rolls 3-5 are embodied without such support elements. As can be seen from FIG. 2, which shows middle roll 4 in diagrammatic form, the middle rolls feature a roll jacket 14 that surrounds an interior space 15. Interior space 15 is closed on the face by roll plugs 16 and 17, to which stub shafts 18 and 19 are attached with which the roll 4 is pivoted in a support not shown in detail.

In the present case, calender 1 is designed for a certain operating speed, i.e., rolls 2 and 6 have a fixed operating rotational speed or rotational frequency. Due to faults in calender 1, which as a rule cannot be completely eliminated, e.g., non-homogeneities, anisotropies or geometric distortions, or faults that are brought into the calender via web 11, e.g., paper thickness fluctuations or basis weight fluctuations, vibrations occur in the calender which contain a plurality of frequencies, thus as a rule form a broadband static. However, if one of the excitation frequencies coincides with a natural frequency of the calender or a part thereof, the vibration system responds with enlarged vibration amplitudes. Due to the plurality of possible exciters and the plurality of the possible natural vibration forms, these resonance points cannot be bypassed by structural devices. As a rule the vibration system is also so strongly damped and the exciter forces are so small, that the resulting vibration movements are not directly disruptive. However, over a shorter or longer period these vibration movements are impressed into the plastic coatings of the elastic rolls 2, 4, and 6.

Usually the integral multiples of the roll rotational frequency nearest to the natural frequency are impressed onto the elastic rolls 2, 4, and 6 as a pattern. As a result a feedback coupling of the vibration is produced. The vibration amplitudes then increase exponentially. They are expressed on the one hand in an increased sound level up to more than 120 dB (A) and on the other hand in periodic fluctuations in the thickness of the paper web running through, which in turn appear as stripes, so-called "barrings." The periods that elapse before such manifestations are so marked that web 11 becomes broke differ. Usually several days or weeks elapse.

Inherent forms belong to the vibrations to which the rolls are subjected and that later lead to the formation of barrings. These lie mainly in a frequency range at which the roll jackets already vibrate in harmonic vibration forms. This is shown by way of example in FIG. 2. Roll jacket 14 here forms three vibration loops between which vibration nodes 20 are located that are marked as circles. To put it more simply, it can be said that roll 4 remains stationary at vibration nodes 20, whereas it vibrates at the vibration loops. This can be seen, e.g., in that with a barring formation the crosswise stripes do not extend uniformly across the paper web, but are particularly marked in the area of the vibration loops.

Instead of the three vibration loops shown, of course roll 4 can also feature more vibration loops, e.g., five or seven or also an even number of vibration loops, e.g., four or six.

In order to damp the vibrations, an absorber arrangement is arranged in interior space 15 of roll 4 with several, in the present case three, vibration absorbers 21. In principle one vibration absorber is sufficient, e.g., at the vibration loop in the axial center. However, it is advantageous if each vibration loop is provided with a passive vibration absorber. The function of the vibration absorber is shown diagrammatically in FIG. 3a. Passive vibration absorber 21 features a mass 22 that is connected respectively via a spring element 23 and a damping element 24 to a support 25 composed of an elastomer material, that is supported on roll jacket 14 from inside. In order to show that mass 22 is supported in all directions on roll jacket 14, corresponding spring and damping elements 23 and 24 are shown for four directions. Ideally, however, there is an isotropic support over the entire interior circumference of roll jacket 14.

FIG. 3b shows a modified embodiment in which mass 22 is supported on roll jacket 14 only via springs 23, which can feature a certain inherent damping.

FIG. 3c shows an embodiment in which the mass 22 is supported on roll jacket 14 only by damping elements 24. The last two embodiments are in general less effective than that shown in FIG. 3a, but as a rule they are still useful for delaying the barring formation.

An absorber frequency can be adjusted with the selection of corresponding spring constants of spring element 23, damping constants of damping element 24 and a mass 22. This absorber frequency is coordinated with the barring frequency that can occur in operation, as shown below:

First of all the contact natural frequency is determined, taking into consideration the structural damping. This determination can be made by calculation or measurement. Subsequently the nearest integral multiples of the roll rotational speed below a contact natural frequency is calculated. Depending on the vibration form, a distinction must hereby be made between odd and even integral multiples. Depending on the level of the structural damping present, nearest multiples below the contact natural frequency must be skipped.

This shall be explained on the basis of a hypothetical example: the contact natural frequency fe is 351.5 Hz. The roll rotational speed fw is 8 Hz. This produces a ratio fe/fw=351.5 Hz/8 Hz=43.9375.

With a degree of system damping D=0.005, there are 43 waves to which vibration absorber 21 has to be aligned. With a degree of system damping D=0.02, there are 41 waves and with a degree of system damping D=0.05 there are 39 waves. This behavior is caused by the phase angle dependent on the degree of damping between the path excitation conditional on barring and the system behavior of the roll response.

Subsequently the natural frequencies of the absorber units, i.e., the absorber frequencies are aligned with these barring frequencies to be expected (roll rotational speed x number of waves). Through the targeted design of the local damping of the absorber units, limited frequency distortions can be compensated for by rotational speed variations of the rolls. However, fundamentally, the absorber frequency is designed for a certain natural frequency. The individual absorber units or vibration absorbers 21 are then positioned in interior space 15 of roll jacket 14 at points of existing vibration loops.

If several relevant contact natural frequencies for the formation of barring exist, several vibration absorbers 21 with different natural frequencies can also be used and thus also placed at different positions in interior space 15 of the roll.

For an absorption of the developing barring frequencies which can be adapted to the production parameters in a largely flexible manner, the natural frequency of vibration absorbers 21 can be designed in a variable manner. This can take place via a remote controlled change of the spring rigidities.

Figure 4:
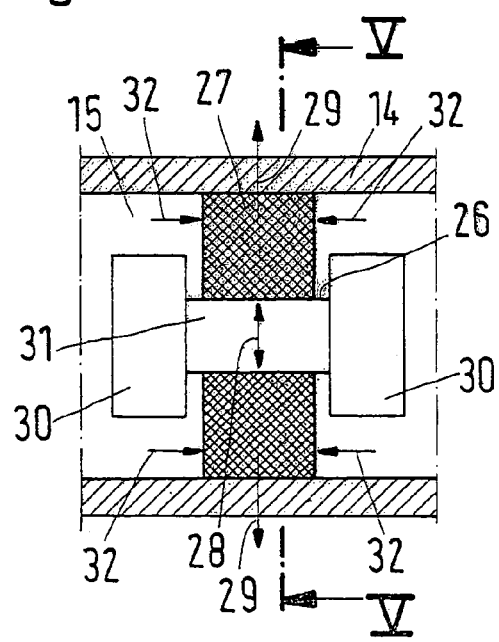
FIG. 4 illustrates a roll with vibration absorber in part in longitudinal section.
Figure 5:
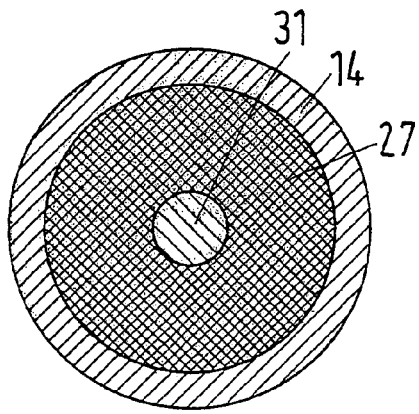
FIG. 5 illustrates a section V-V depicted in FIG. 4.

An example of a concretely executed vibration absorber 21 is shown in FIGS. 4 and 5.

Vibration absorber 21 features as a mass a dumb-bell-shaped mass element 26 that is supported in a disk 27 of an elastic material. Disk 27 in turn is supported on roll jacket 14 from the inside over the entire circumference of roll jacket 14. Disk 27 thereby has a uniform compression and damping behavior in all directions. Disk 27 thus constitutes the spring and damping elements 23 and 24.

As shown by an arrow 28, mass element 26 can be displaced due to the elasticity of disk 27. With a correct alignment, the movement of mass element 26 counteracts a movement of roll jacket 14 shown by arrows 29. A passive vibration damping of roll jacket 14 thus occurs.

Mass element 26 is formed or embodied in a dumb-bell shape, i.e., it features two areas 30 with enlarged diameter that are located outside disk 27. These two enlarged areas 30 are connected by a connecting rod 31. The mass of mass element 26 can thus be enlarged. Nevertheless, there is sufficient elastic material available in disk 27 so that mass element 26 can be displaced to an adequate extent.

Arrows 32 indicate a device with which disk 27 can be compressed in the axial direction in order to change its spring rigidity. However, these devices must not obstruct the mobility of mass element 26 in the radial direction. By changing the spring rigidity, the absorber frequency can be changed.

With the vibration absorber it is therefore possible in a relatively simple manner to damp vibrations of roll jacket 14 without supplying external energy. Although the damping will not completely eliminate the development of barring in some cases, the time that elapses before the critical development of barring patterns can be clearly lengthened.

Figure 6:
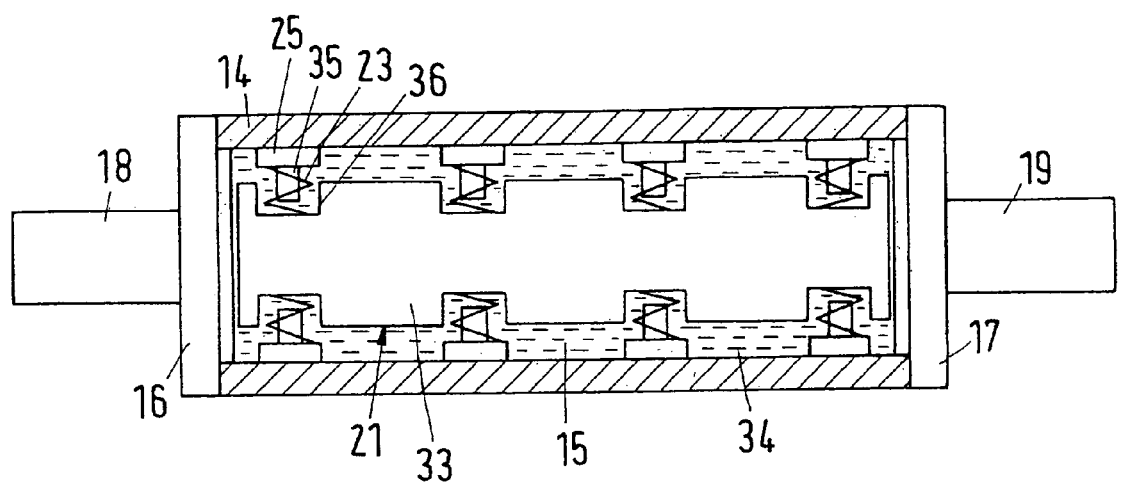
FIG. 6 illustrates an embodiment of a middle roll with vibration absorber modified from that depicted in FIG. 2.

FIG. 6 shows an embodiment of a roll that is modified with respect to FIG. 2 or 4, in which vibration absorber 21 is embodied as a roll-shaped slide-in body 33. Slide-in body 33 extends virtually over the entire axial length of roll jacket 14 and features a mass that corresponds to at least 15% or even at least 20% of the mass of roll jacket 14. A liquid 34 is arranged in interior space 15, e.g., a highly viscous oil, which gives rise to damping properties with the movement of slide-in body 33 with respect to roll jacket 14. Slide-in body 33 is supported on roll jacket 14 via springs 23, whereby the springs are supported on a support 25 that features a support projection 35. Springs 23 engage in cup-shaped recesses 36 on the circumference of slide-in body 33. There is thus a small rotatory degree of freedom for slide-in body 33 in roll jacket 14, i.e., slide-in body 33 can rotate to and fro in a small angle range about a neutral position relative to roll jacket 14.

Figure 7A:
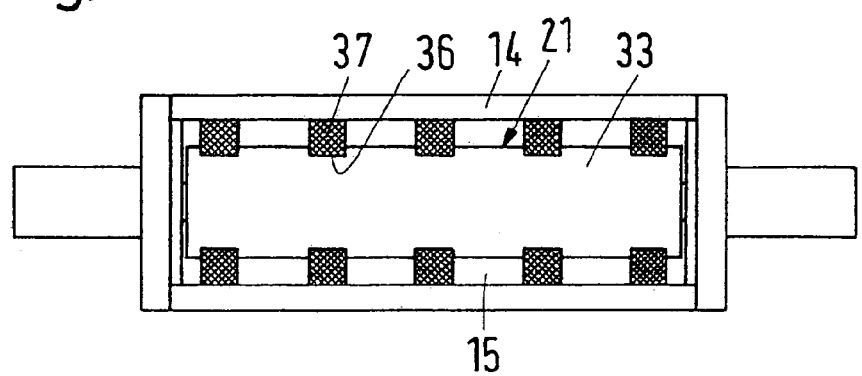
FIGS. 7A and 7B illustrate a special development of the embodiment depicted in FIG. 6.
Figure 7B:
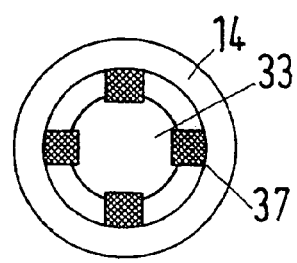

FIGS. 7A and 7B show a modified embodiment. The same elements and elements with the same function are assigned the same reference numbers.

Supporting slide-in body 33 in roll jacket 14 is carried out via support elements 37 that are made of a viscoelastic material, e.g., a rubber or a comparable plastic. Thus, support elements 37 at the same time take on the function of a spring and the function of a damper. Here only a fixing of support elements 37 on slide-in body 33 occurs. In the interior of roll jacket 14, support elements 37 are held by their own tensional force, i.e., no individual mounting geometries need to be provided here.

Figure 8:
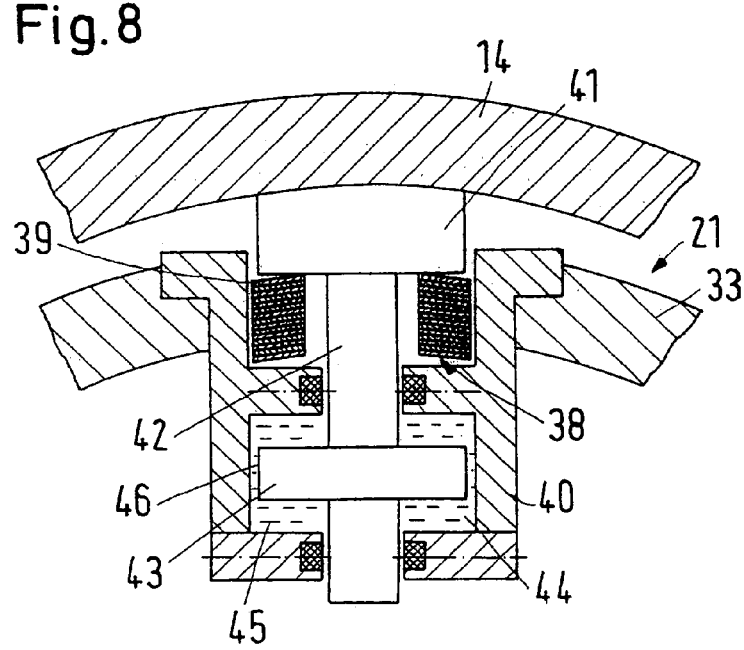
FIG. 8 illustrates an alternative mounting of the vibration absorber in the roll jacket.

FIG. 8 shows an alternative in which roll-shaped slide-in body 33 is held in roll jacket 14 via a spring packet 38. Spring packet 38 comprises a plurality of cup springs 39. Spring packet 38 is clamped between an insert 40, which is attached in slide-in body 33, and a strut 41 that rests on roll jacket 14 from the inside. An extension 42 of strut 41 that extends radially inwards projects through spring packet 38.

Cup springs 39 of spring packet 38 have per se a relatively good damping behavior. The damping behavior of the support can be improved still further, if an enlargement 43 is arranged on extension 42, which enlargement dips into a damping chamber 44 that is filled with a liquid 45. When strut 41 moves with respect to insert 40, liquid 45 has to pass through a ring slot 46 into damping chamber 44, which results in an improved damping effect.

Figure 9:
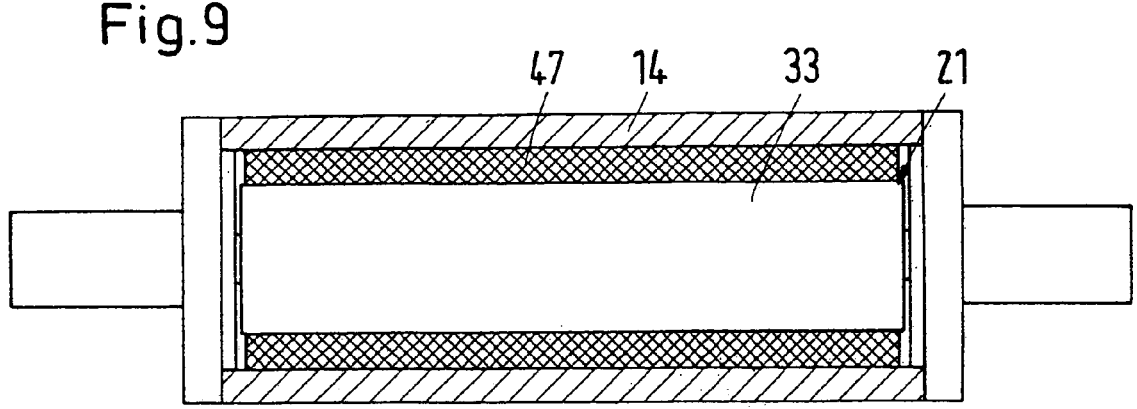
FIG. 9 illustrates another modified embodiment of a vibration absorber.

With the embodiment shown in FIG. 9, slide-in body 33 is held in roll jacket 14 by an intermediate layer 47 of a viscoelastic material, e.g., a rubber or a comparable plastic. The fixing of slide-in body 33 in roll jacket 14 is carried out in that roll-shaped slide-in body 33 including surrounding intermediate layer 47 is shrunk in roll jacket 14.

Figure 10:
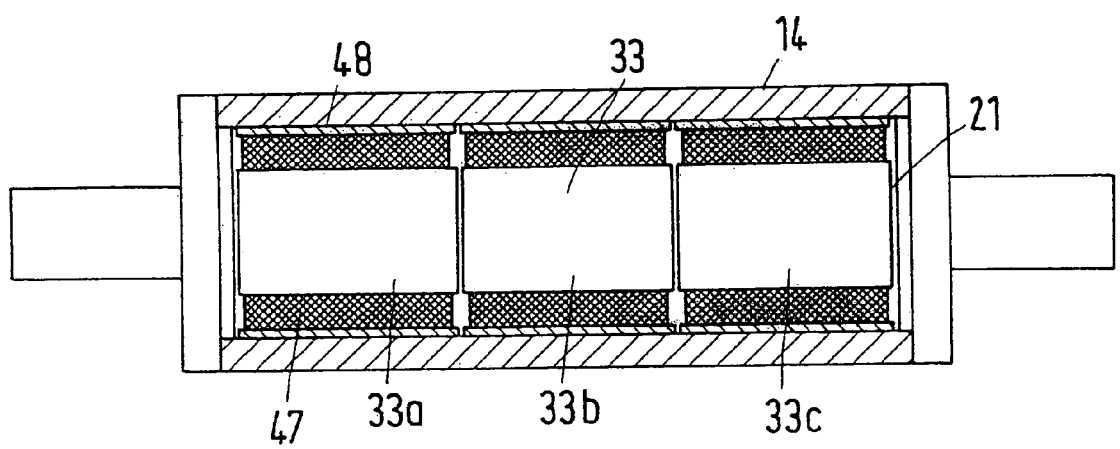
FIG. 10 illustrates an additional embodiment of a vibration absorber.

With the embodiment according to FIG. 10, it can be seen that slide-in body 33 is divided into several sections 33*a*, 33*b*, and 33*c*. Each of these sections is surrounded by an intermediate layer 47. Intermediate layer 47 in turn is surrounded by a pipe 48 of metal that when installed is arranged between intermediate layer 47 and roll jacket 14. Such a pipe 48 facilitates the shrinking. This pipe can be cooled before the insertion of slide-in body 33 in roll jacket 14 so that intermediate layer 47 is compressed. Roll jacket 14 then only needs to be heated to a slighter extent in order to expand before slide-in body 33 provided with pipe 48 or individual parts 33*a*-33*c* of the slide-in body can be inserted into roll jacket 14.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A roll comprising:
   a roll jacket structured and arranged to surround an interior space;
   an absorber arrangement comprising at least one passive vibration absorber located within the interior space;
   a damper arrangement positioned between said vibration absorber and said roll jacket;
   a spring arrangement combined with said damper arrangement to support said vibration absorber in said roll jacket; and
   at least one support composed of an elastomer material, wherein said vibration absorber is supported on said roll jacket via said at least one support.

2. The roll in accordance with claim 1,
   wherein said vibration absorber has an absorber frequency that lies below a natural frequency of said roll.

3. The roll in accordance with claim 1 in combination with a calender roll stack, said calender roll stack comprising at least two end rolls and at least one middle roll comprising said roll.

4. The roll in accordance with claim 1, wherein said vibration absorber is arranged to act on said roll jacket.

5. The roll in accordance with claim 4, wherein said vibration absorber is structured and arranged to act on said roll jacket in a damping manner.

6. The roll in accordance with claim 1, wherein said vibration absorber comprises a mass that is at least 15% of a mass of said roll jacket.

7. The roll in accordance with claim 6, wherein said mass is at least 20% of the mass of said roll jacket.

8. The roll in accordance with claim 1, wherein said vibration absorber is positioned, in an axial direction of the roll jacket, at a location at which a vibration loop forms during operation.

9. The roll in accordance with claim 8, wherein said vibration absorber comprises a plurality of individual absorbers that are positioned, distributed in the axial direction, at locations at which vibration loops form during operation.

10. The roll in accordance with claim 9, wherein an individual absorber is arranged at each vibration loop.

11. The roll in accordance with claim 1, wherein a natural frequency is decisive of the formation of barring.

12. The roll in accordance with claim 1,
    wherein said vibration absorber has an absorber frequency that lies below a natural frequency of a roll system comprising said roll.

13. The roll in accordance with claim 12, wherein the natural frequency is decisive of the formation of barring.

14. The roll in accordance with claim 1, wherein a absorber frequency is coordinated with a barring frequency.

15. The roll in accordance with claim 1, wherein said vibration absorber comprises a roll-shaped body.

16. The roll in accordance with claim 15, wherein said roll-shaped body is structured and arranged to slide into said roll.

17. The roll in accordance with claim 1, wherein said spring arrangement comprises a plurality of cup springs.

18. The roll in accordance with claim 1, wherein said vibration absorber is structured and arranged to be moveable relative to said roll jacket.

19. The roll in accordance with claim 18, wherein said vibration absorber is structured to be rotatably movable relative to said roll jacket.

20. The roll in accordance with claim 19, wherein said vibration absorber is structured to be limitedly rotatably movable relative to said roll jacket.

21. The roll in accordance with claim 1, further comprising a liquid arranged to fill, at least in an area between said vibration absorber and said roll jacket, said interior space.

22. The roll in accordance with claim 21, wherein said liquid has a viscosity that exceeds a predetermined minimum.

23. The roll in accordance with claim 1, wherein said vibration absorber comprises a surrounding intermediate layer composed of a viscoelastic material.

24. The roll in accordance with claim 23, wherein said surrounding intermediate layer is shrunk in said roll jacket.

25. The roll in accordance with claim 23, further comprising a pipe arranged between said roll jacket and said intermediate layer.

26. The roll in accordance with claim 1, wherein said vibration absorber comprises a mass element supported in at least one disk composed of an elastic material, and wherein said disk is supported on said roll jacket.

27. The roll in accordance with claim 26, wherein said disk rests on said roll jacket over its entire circumference.

28. The roll in accordance with claim 26, wherein said mass element projects beyond said disk in an axial direction of said roll.

29. The roll in accordance with claim 26, wherein said mass element comprises an enlargement outside of said disk.

30. The roll in accordance with claim 1, wherein said vibration absorber has an adjustable absorber frequency.

31. The roll in accordance with claim 30, wherein said absorber frequency is adjustable from outside of said roll.

32. The roll in accordance with claim 30, wherein said vibration absorber comprises a spring unit having a rigidity that can be changed in a controlled manner.

33. The roll in accordance with claim 1, wherein said absorber arrangement comprises vibration absorbers having different absorber frequencies.

34. A calender with a roll stack having at least two middle rolls, at least one of said at least two middle rolls being said roll in accordance with claim 1.

* * * * *